(12) United States Patent
Harth, III

(10) Patent No.: US 6,852,945 B2
(45) Date of Patent: Feb. 8, 2005

(54) LASER WELDING BOILER TUBE WALL PANELS

(75) Inventor: George H. Harth, III, Wadsworth, OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 0 days.

(21) Appl. No.: 10/175,297

(22) Filed: Jun. 19, 2002

(65) Prior Publication Data

US 2003/0234241 A1 Dec. 25, 2003

(51) Int. Cl.[7] .............................................. B32K 26/00
(52) U.S. Cl. .................................... 219/121.64; 219/61
(58) Field of Search ...................... 219/121.64, 121.63, 219/61

(56) References Cited

U.S. PATENT DOCUMENTS

| | | | |
|---|---|---|---|
| 2,993,983 A | | 7/1961 | Carpenter et al. |
| 3,045,340 A | | 7/1962 | Kolling |
| 3,246,117 A | | 4/1966 | Smith |
| 3,258,577 A | | 6/1966 | Smith |
| 3,342,973 A | | 9/1967 | Smith et al. |
| 4,507,540 A | * | 3/1985 | Hamasaki ............... 219/121.64 |
| 4,737,612 A | * | 4/1988 | Bruck et al. ........... 219/121.64 |
| 4,990,741 A | | 2/1991 | Moores et al. |
| 5,229,571 A | | 7/1993 | Neiheisel |
| 5,532,445 A | | 7/1996 | Junker |
| 5,563,391 A | | 10/1996 | Dahm |
| 5,760,365 A | | 6/1998 | Milewski et al. |
| 5,821,493 A | | 10/1998 | Beyer et al. |
| 5,859,402 A | * | 1/1999 | Maier ..................... 219/121.64 |
| 6,034,343 A | | 3/2000 | Hashimoto et al. |
| 6,211,483 B1 | | 4/2001 | Bishop |
| 6,300,591 B1 | | 10/2001 | Fuerschbach et al. |
| 2001/0052511 A1 | | 12/2001 | Briand et al. |

FOREIGN PATENT DOCUMENTS

JP 5-131283 * 5/1993

OTHER PUBLICATIONS

*Steam*, Its Generation and Use, 40th Edition, The Babcock & Wilcox Company, ©1992, p. 22–1 to 22–4, p. 38–1 to 38–3 and p. 38–6 to 38–7.
"Laser Welding", http://www.laserage.com/welding.htm, Laserage Technology Corporation, ©2001, Last modified Jul. 17, 2001.
C.B. Miller, "Laser Welding Article," http://www.uslasercorp.com/Envoy/welding.htm, U.S. Laser Corporation, No date, printed Nov. 26, 2001.
"Laser Welding", http://www.convergentprima.com/Laser_Applications/Laser_Beam_Machining/Welding/welding-.html, Convergent Prima, ©1995–2001, Sturbridge, MA, No date, printed Feb. 6, 2002.
P. Hilton, "Nd:YAG laser welding (Mar. 2001)", http://www.twi.co.uk/j32k/protected/band_3/kspah003.html, TWI Ltd, ©2001.
"Laser Welding", http://www.alspi.com/welding.htm, Alabama Laser Technologies, No date, printed Nov. 26, 2001.
"Laser Welding", http://www.lmclaser.com.au/welding.htm, No date, printed Nov. 26, 2001.

(List continued on next page.)

*Primary Examiner*—Kiley S. Stoner
*Assistant Examiner*—Len Tran
(74) *Attorney, Agent, or Firm*—Kathryn W. Grant; Eric Marich

(57) ABSTRACT

A method of welding together the parts of a boiler tube wall panel includes placing at least two parts of the panel to be welded together along a weld line and adjacent each other, and forming a weld along the weld line using a laser beam. The method can advantageously be used to weld boiler tube wall panels solely from one side of the panel. A GMAW process can also be used in combination with the laser beam to form the weld. Where the boiler tube wall panel includes a membrane between tubes, the membrane may be beveled.

33 Claims, 4 Drawing Sheets-

OTHER PUBLICATIONS

"Carbon dioxide laser (Feb. 2000)", http://www.twi.co.uk/j32k/protected/band_3/kspah002.html, TWI Ltd, ©2000.

D. Johnson et al, "Application Experiences with Laser Beam Welding," http://www.alspi.com/lsrweld.htm, Alabama Laser, No date, printed Nov. 26, 2001.

* cited by examiner

LASER WELDING BOILER TUBE WALL PANELS

FIELD AND BACKGROUND OF THE INVENTION

The present invention relates generally to the field of welding and, in particular, to a new and useful method of welding boiler tube wall panels using lasers.

Boiler tube wall panels or membrane panels of all types can be welded by the present invention. Such panels are either welded together, sided-by-side tubes with tangent tube welds therebetween, or tubes alternating with narrow flat plates called membrane bars, or round rods or bars to form a gas-tight wall. The tubes are generally about 1½ to 3 inches OD with wall thicknesses of about 0.15 to 0.30 inches. The thickness of the plates between the tubes is about ¼ to ⅜ and they can be up to about 3 inches wide. The plates are thus zero to 3 inches wide, the zero dimension indicating no plate present, i.e. a tangent tube weld, between adjacent tubes. The rod or round bar is about ⅛ to ½ inches in diameter. Welds needed to assemble such boiler tube wall panel parts must be from about 10 to 60 feet long or more since the panels can be this length. The panels can also be as narrow as only two tangent welded tubes and up to 8 feet wide and of the tangent welded, membrane plate or round bar types.

Tube wall panels can be made of various metals that range from inexpensive carbon steel to chromium molybdenum alloys, to composites with a metallurgically bonded stainless or Inconel (a trademark) sheath over carbon steel. Examples of the alloys that are used are Croloy 2¼ (2¼ Cr-1 Mo), also known as SA-213 T22, and another alloy designated SA-213 T23.

For a general description of the characteristics of boiler tube wall panels and welding processes currently used in making them, the reader is referred to Chapters 22 and 38 of Steam/Its Generation and Use, 40th Edition, The Babcock [[and]] & Wilcox Company, Barberton, Ohio, U.S.A., ©1992, the text of which is hereby incorporated by reference as though fully set forth herein.

It is known to use SAW (submerged-arc welding) and GMAW (gas metal-arc welding) to weld boiler tube wall panels together. These processes are slow and lead to distortion of the panels since they impart much heat to the tubes and/or plates or rods being welded together. Control of these processes is difficult due to the need to position both arc and weld wire through flux (SAW) while shielding the welder from arc burns (GMAW). Welds must also be made from both sides of the panel to produce fillets on both sides of the panel. This in turn requires significant time and effort to flip over the long, unwieldy panels in order to weld the back sides of the panels.

It is also generally known that lasers, in particular CO2 and Nd:YAG lasers, can be used to weld various types of metals to each other. See, for example, four articles all entitled "Laser Welding" at http://www.laserage.com/welding.htm, http://www.lmclaser.com.au/welding.htm, http://www.convergentprima.com/Laser_Applications/Laser_Beam_Machining/Welding/welding.htm, and http://www.alspi.com/welding.htm; "Laser Welding Article" at http://www.uslasercorp.com/Envoy/welding.htm; "Nd:YAG laser welding (March 2001)" at http://www.twi.co.uk/j32k/protected/band__3/kspah003.html;""Carbon dioxide laser" (February 2000) at http://www.twi.co.uk/j32k/protected/band__3/kspah002.html; and "Application Experiences with Laser Beam Welding" at http://www.alspi.com/lsrweld.htm.

Laser welding has been used to make welds in thin sheet metal or to make spot welds, but not to weld together parts of a boiler tube wall panel which are quite thick in comparison and require deep, gas-tight welds.

Also see U.S. Pat. Nos. 4,990,741; 6,300,591; 5,760,365; 5,229,571; 6,211,483 and 5,563,391.

A need remains for an effective and improved way to weld together the parts of a boiler tube wall panel.

SUMMARY OF THE INVENTION

It is an object of the present invention to provide a method of welding together the parts of a boiler tube wall panel which comprises placing at least two parts of the panel to be welded along a line, adjacent each other, and forming a weld along the line using a laser beam.

The present invention is possible because lasers now have the capacity to weld in an industrial setting. In one embodiment, the laser is used to replace SAW and GMAW welding provided proper placement and fixation of the panel parts is used. The method advantageously can simultaneously produce a fillet on both sides of the boiler tube wall panel, thereby reducing stress concentration. The method can therefore be used to weld boiler tube wall panels solely from one side of the panel, while still producing a full penetration weld, i.e. a weld that penetrates to the opposite side of the panel. This in turn reduces panel welding time and distortion. Distortion is also reduced because laser welding imparts less heat to the panel parts to form a weld.

Laser welding further reduces span time and distortion as well as the occurrence of defects, because laser welding is easier to control. A laser can also be used to weld areas of a panel that cannot be welded by other methods due to limited access. The great bulk of panel welding machines is also greatly reduced by using laser welding with no need to shield an arc from the welder.

In another embodiment, the invention includes combining GMAW welding and laser welding. This embodiment is a method for welding together at least two parts of a boiler tube wall panel along a weld line comprised of placing the at least two parts of the panel adjacent each other, and forming a weld along the weld line using a laser beam and a GMAW process.

In yet another embodiment, applicable to a membrane boiler tube wall panel, the membrane to be welded along a line to a boiler tube is beveled along the weld line adjacent the boiler tube. This embodiment is a method for welding together at least one boiler tube and at least one boiler tube membrane along a weld line. The method comprises providing at least one boiler tube and at least one boiler tube membrane. The at least one membrane has a first longitudinal edge, a second longitudinal edge and a bevel along the first longitudinal edge. The at least one boiler tube and the at least one boiler tube membrane are placed next to each other with the first and second longitudinal edges adjacent the at least one boiler tube. A weld is formed along the first longitudinal edge using a laser beam and a GMAW process.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
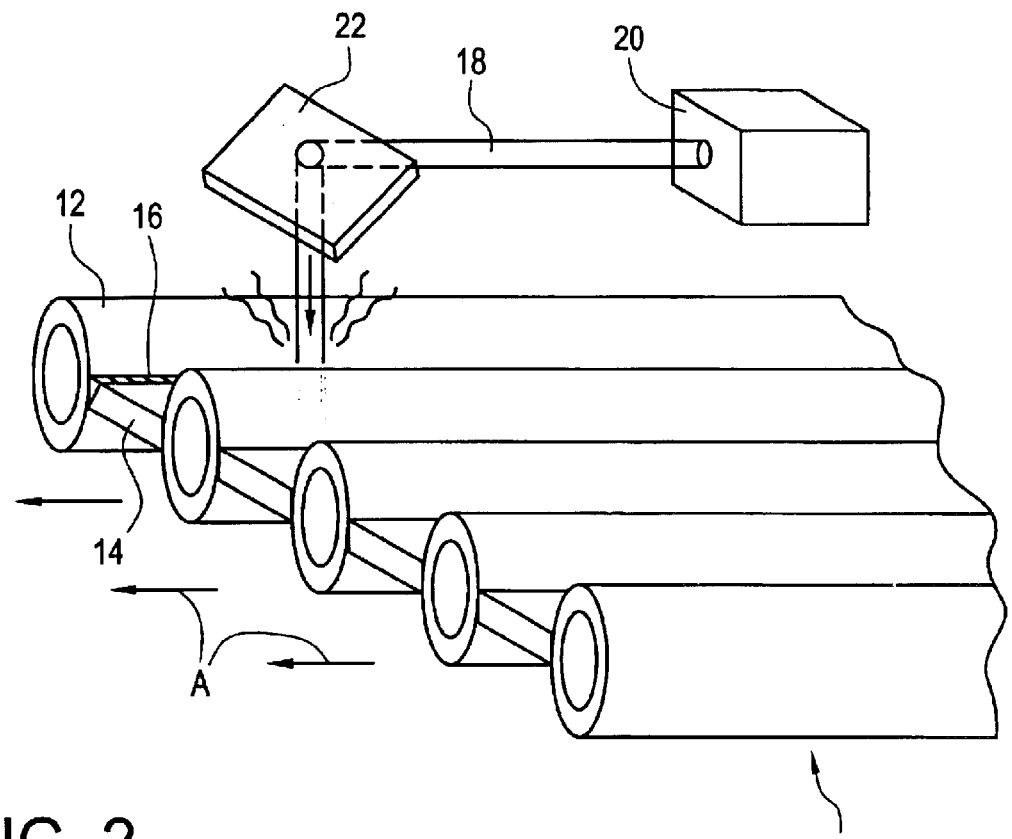
FIG. 1 is a schematic illustration of an embodiment of the invention for laser welding together the parts of a boiler tube wall panel with membrane bars between the tubes.

Referring now to the drawings, in which like reference numerals are used to refer to the same or similar elements, FIG. 1 illustrates a method for welding together at least two parts of a boiler tube wall panel 10, such as a first tube 12 to a first side of a first membrane plate 14, along a weld line 16, which comprises placing the tube 12 adjacent the plate 14, and forming a weld along the weld line 16 using a laser beam 18 generated in, and coming from a laser source 20, and reflected by a mirror 22. Alternatively, laser beam 18 can be transmitted from laser source 20 to weld line 16 via fiber optics. Laser beam 18 may be split into multiple beams to simultaneously produce a number of parallel welds using techniques known in the art.

A carriage (not shown) with jigs (not shown) supports and holds the parts of the panel in correct orientation to each other, and moves them in the direction of arrows A, under the laser beam 18 at a correct linear rate to form the weld. After the first weld 16 is made, the carriage is shifted perpendicularly to arrows A, to bring the point of impact of laser beam 18, onto the start of the next weld line to be created. The carriage is then again moved, but this time opposite to the arrows A to form the next weld line. This operation is repeated until all the welds are made. Alternatively, laser beam 18 may move, while the parts of boiler tube wall panel 10 remain stationary.

Figure 2:
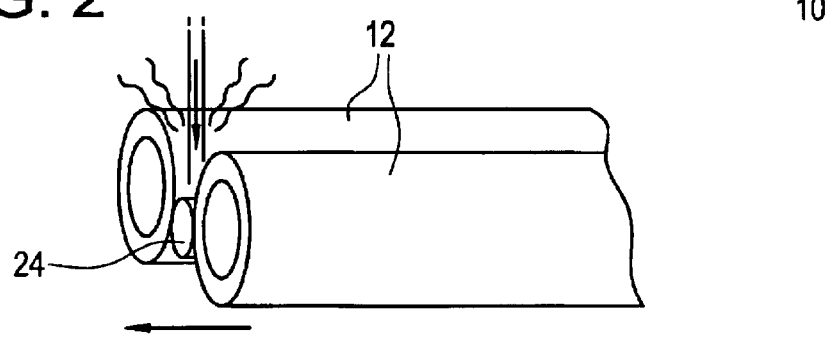
FIG. 2 is a view similar to FIG. 1 of another embodiment of the invention for laser welding together the parts of a boiler tube wall panel with round bars or rods between the tubes.
Figure 3:
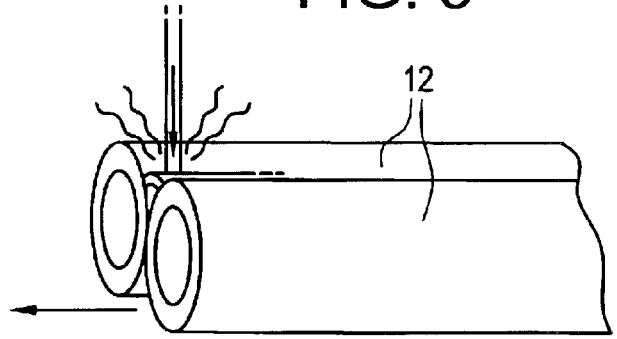
FIG. 3 is a view similar to FIG. 1 of an embodiment of the invention for laser welding together the parts of a boiler tube wall panel with tangent welds between the tubes.

FIGS. 2 and 3 illustrate similar arrangements for welding together the parts of round bar or rod 24 plus tube 12 panels (FIG. 2) and tangent welded panels made of two or more tubes 12 (FIG. 3).

Figure 4:
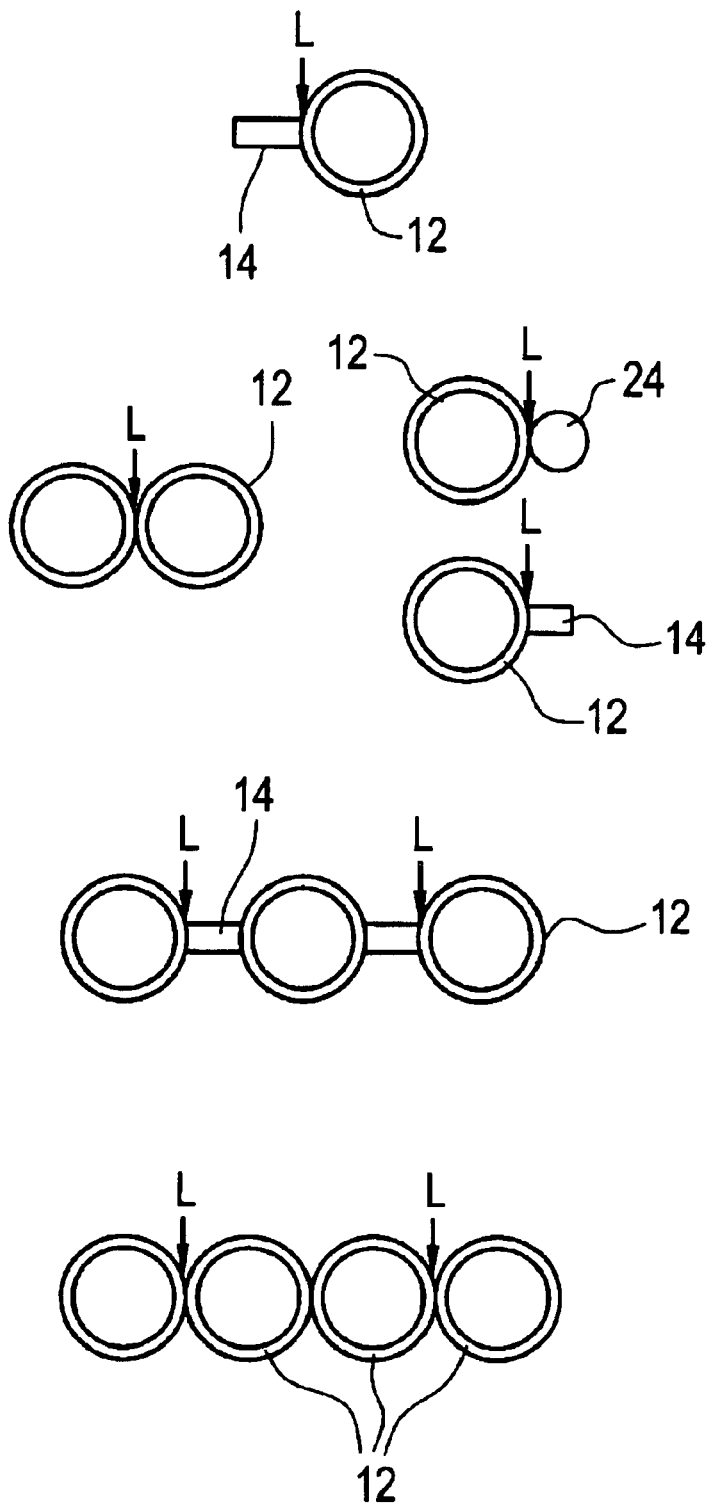
FIG. 4 is a diagram showing the direction of a laser welding beam used to weld parts of various panel configurations according to the invention.

FIG. 4 shows various orientations for the laser processing direction L, and the various boiler panel types that can be welded by the present invention.

Commercially available $CO_2$ or Nd:YAG lasers can be used as laser source 20.

Figure 5:
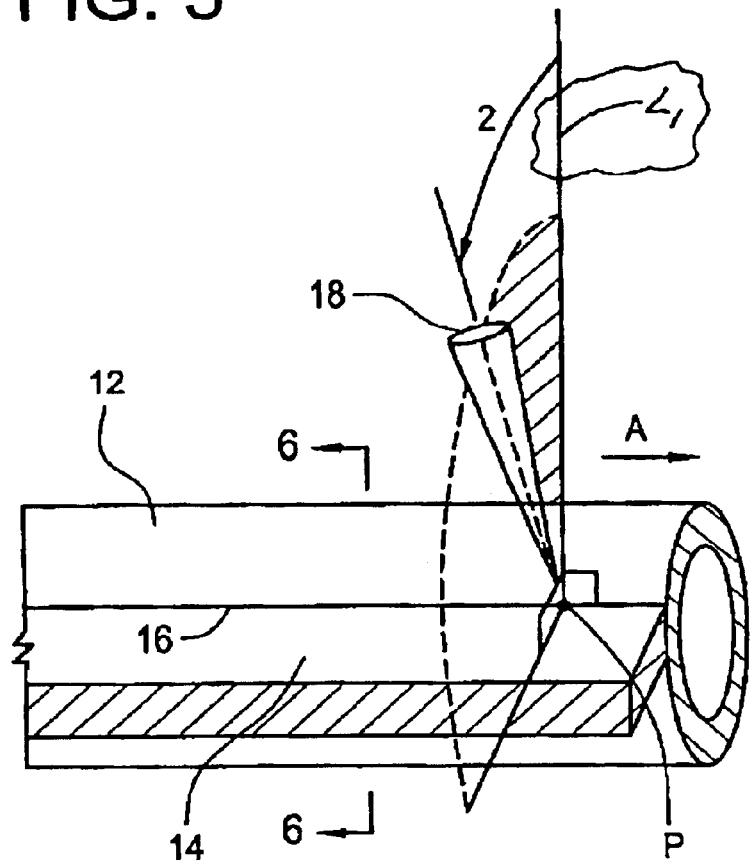
FIG. 5 is a diagram illustrating a setup for an embodiment of the invention for laser welding a boiler tube wall panel.

FIG. 5 shows a preferred setup of the invention for a first embodiment of the invention in which a laser beam 18 is used to form the weld line 16. According to this embodiment, laser beam 18 is advantageously directed toward the weld line 16 inclined at a laser beam angle 2, measured from a line $L_1$ perpendicular to a plane of the panel and in a plane perpendicular to the weld line 16, within the range of about 2 to 15 degrees, and preferably about 5 to 10 degrees.

In a laboratory test of the above laser-only embodiment membrane plate 14 was successfully welded along weld line 16 to a tube 12 solely from one side of the membrane plate 14, using the following process parameters:

| laser travel speed: | about 35 inches per minute |
| --- | --- |
| laser power: | 5.5 kW |

Laser beam 18 was directed toward the welding point P at a laser beam angle 2 of about 5 degrees. The tube 12 used in the test was a carbon steel tube having an outer diameter of 1.5 inches and a wall thickness of 0.203 inches. The membrane plate 14 was made of A36 steel having a thickness t of 0.25 inches and a width w of 0.5 inches.

Figure 6:
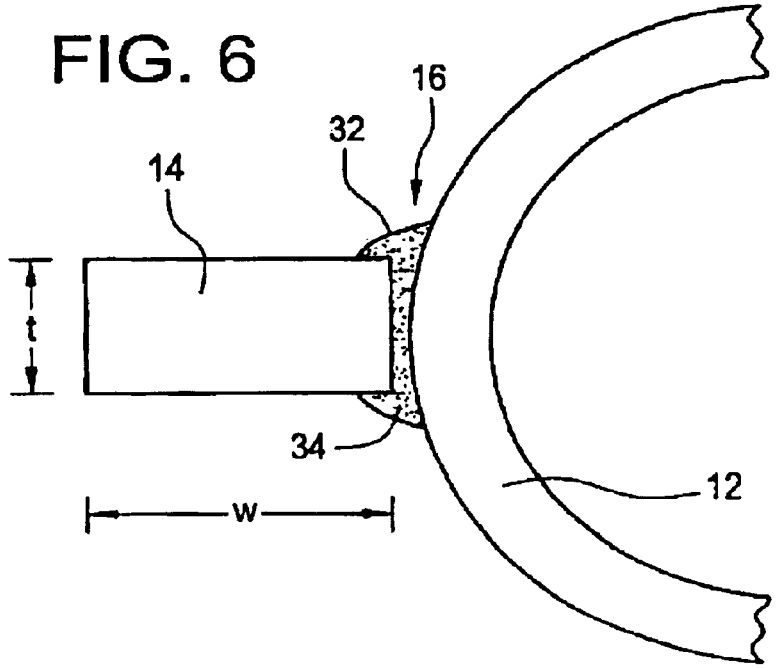
FIG. 6 is a partial cross-sectional view of a membrane plate and boiler tube welded according to the embodiment of FIG. 5.

Significantly membrane plate 14 was welded to a boiler tube 12 by welding only from one side of the membrane plate 14 in a single pass, i.e. along a single weld line, yet still produced a full penetration weld, a weld that penetrated to the opposite side of the membrane plate 14. Advantageously, the method produced not only a weld side fillet 32 located along weld line 16 but also a produced a back side fillet 34, as shown in FIG. 6. The back side fillet 34 joined the boiler tube 12 and the side of membrane plate 14 opposite the weld line 16 thereby reducing stress concentration at this location. The above results are unexpected, since welding on both sides of a boiler tube wall panel is the long-held industry standard for producing a full penetration membrane weld with a fillet on both sides of the membrane.

Figure 7:
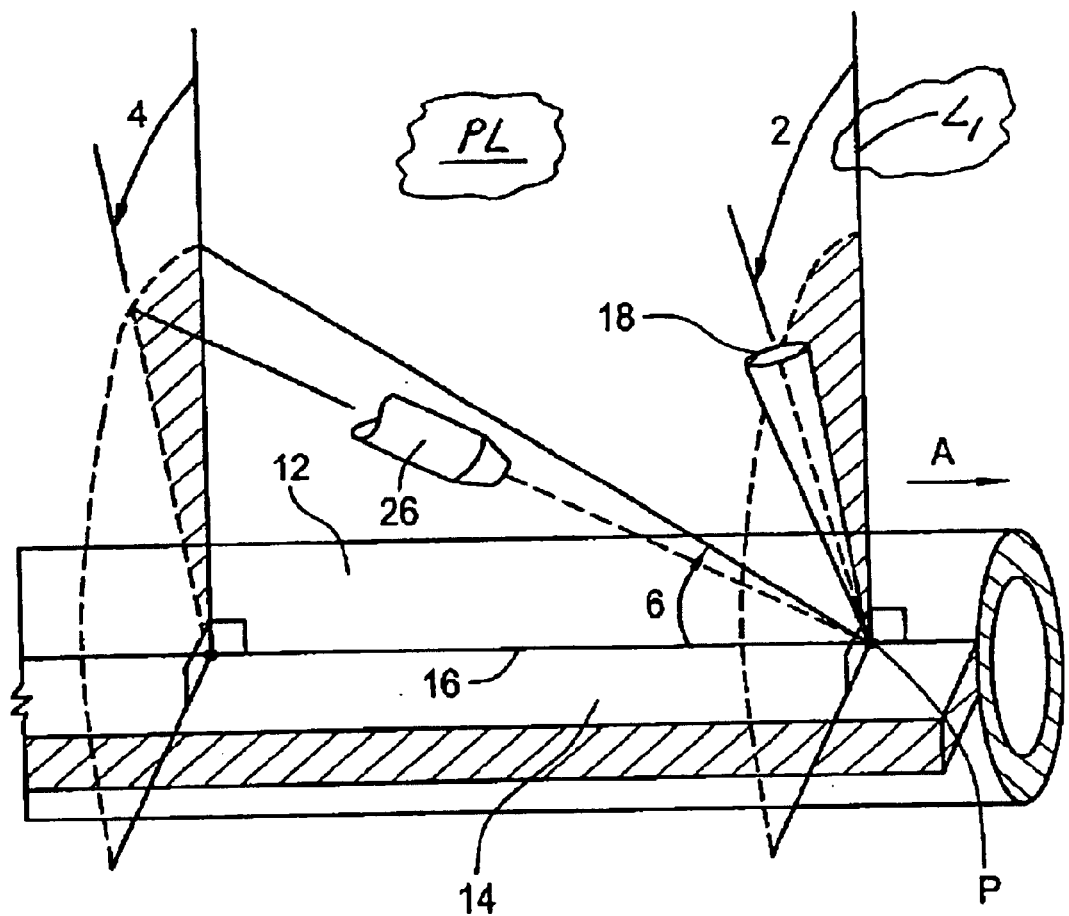
FIG. 7 is a diagram illustrating a setup for an embodiment of the invention that combines laser with GMA welding.

FIG. 7 shows a preferred setup of the invention for a second embodiment that combines a known GMAW welding head 26 with the laser beam 18 to form the weld line 16. For a fixed laser power, the addition of GMAW welding head 26 makes the method of the present invention more reliable in a production environment.

In the laser-plus-GMAW embodiment laser beam 18 is advantageously directed toward the weld line 16 inclined at the laser beam angle 2, as shown in FIG. 7, within the range of about 2 to 15 degrees, and preferably about 5 to 10 degrees, and the GMA welding axis is directed toward the weld line 16 at a torch angle 4 of about 5 degrees measured from a plane PL perpendicular to the plane of the panel and containing the weld line 16, also as shown in FIG. 7 (or within the range of about 2 to 15 degrees). Further the GMA welding axis is applied at a lead angle 6 relative to the travel direction A within the range of about 10 to 50 degrees or preferably about 20 to 40 degrees.

For purposes of illustration only, consider an application where a line parallel to the longitudinal axis of a tube 12 defines a horizontal direction at a point P on the weld line 16, and a vertical direction at point P perpendicular to the horizontal direction. Then laser beam angle 2 and torch angle 4 are both defined relative to a vertical plane PL passing through the weld line 16 and perpendicular to the plane of the panel, and lead angle 6 is defined relative to a horizontal plane passing through the weld line 16.

Figure 8:
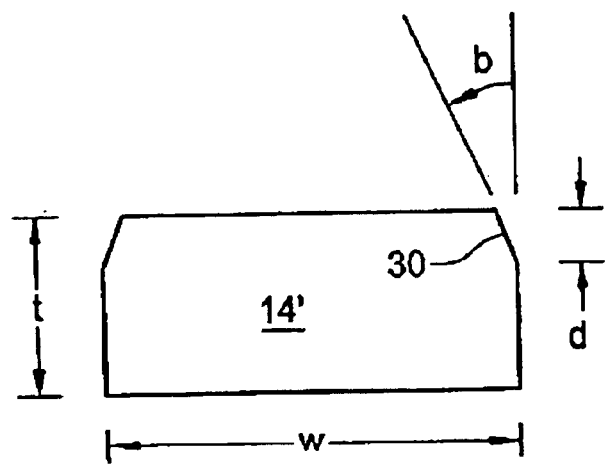
FIG. 8 is a cross-sectional view of a membrane plate for a boiler tube wall panel according to an embodiment of the invention.

FIG. 8 illustrates a preferred arrangement of a third embodiment of the invention in which the membrane plate 14 is modified to include a bevel 30 along the edge adjacent weld line 16. The beveled membrane plate 14' is beveled at a bevel angle b to a depth d.

In a laboratory test of the laser-plus-GMAW embodiment with a beveled membrane plate 14", the beveled membrane plate 14' was successfully welded along weld line 16 to a tube 12 solely from one side of the membrane, using the following process parameters:

| | |
|---|---|
| laser and GMAW travel speed: | about 31 inches per minute |
| laser power: | 5 kW |
| GMAW shield gas: | 100% helium |
| GMAW wire: | 0.035" dia. ER70S-3 |
| GMAW wire feed speed: | about 100 inches per minute |
| GMAW voltage: | about 25 volts |
| GMAW peak current: | 100 amps |
| GMAW background current: | 30 amps |

GMAW welding head 26 was directed toward the welding point P at a torch angle 4 of about 5 degrees and a lead angle 6 of about 32 degrees. Laser beam 18 was directed toward the welding point P at a laser beam angle 2 of about 5 to 10 degrees. The tube 12 used in the test was a low alloy carbon steel tube having an outer diameter of 1.5 inches and a wall thickness of 0.203 inches. The membrane plate 14 was made of A36 steel having a thickness t of 0.25 inches and a width w of 0.5 inches. Membrane plate 14 was preferably modified to include a bevel 30 along the edge adjacent weld line 16, as shown in FIG. 8. Membrane plate 14 was beveled to a depth d of $\frac{1}{16}$ of an inch at a bevel angle b of about 30 degrees.

It is important to note that the test parameters identified in the above examples were obtained under laboratory process conditions that may or may not fully represent production process conditions.

While specific embodiments of the invention have been shown and described in detail to illustrate the application of the principles of the invention, it will be understood that the invention may be embodied otherwise without departing from such principles.

What is claimed is:

1. A method for welding together at least two parts of a boiler tube wall panel along a weld line, the boiler tube wall panel having two sides, comprising: placing the at least two parts of the boiler tube wall panel adjacent each other, and simultaneously producing a fillet on both sides of the boiler tube wall panel by forming a full penetration weld along the weld line solely from one side of the boiler tube wall panel in a single pass using a laser beam directed at a laser beam angle measured from a line perpendicular to a plane of the boiler tube wall panel and in a plane perpendicular to the weld line.

2. A method according to claim 1, wherein the boiler tube wall panel parts include at least two tubes, the method including welding a tangent weld between the tubes.

3. A method according to claim 2, wherein each tube is about 1½ to 3 inches OD with wall thicknesses of about 0.15 to 0.30 inches.

4. A method according to claim 1, wherein the boiler tube wall panel parts include at least one tube and at least one plate, the at least one plate having a first edge and a second edge adjacent the at least one tube, the method including welding a first edge of the at least one plate to an outside surface of the at least one tube.

5. A method according to claim 4, further comprising:
   producing a first fillet between the at least one tube and the at least one plate along the first edge;
   producing a second fillet between the at least one tube and the at least one plate along the second edge; and
   whereby the first and second fillets are produced by welding along a single weld line.

6. A method according to claim 5, wherein the plate is beveled along the weld line.

7. A method according to claim 4, wherein the tube is about 1½ to 3 inches OD with wall thicknesses of about 0.15 to 0.30 inches, the thickness of the plate being about ¼ to ⅜ inches and the plate being from zero to about 3 inches wide.

8. A method according to claim 1, wherein the boiler tube wall panel parts include at least one tube and at least one round bar, the method including welding the round bar to an outside surface of the tube.

9. A method according to claim 8, wherein the round bar is about ⅛ to ½ inches in diameter.

10. A method according to claim 1, wherein the weld line is about 10 to 60 feet long.

11. A method according to claim 1, further comprising directing the laser beam at a laser beam angle of about 2 to 15 degrees.

12. A method for welding together at least two parts of a boiler tube wall panel along a weld line, the boiler tube wall panel having two sides comprising: placing the at least two parts of the boiler tube wall panel adjacent each other, and simultaneously producing a fillet on both sides of the tube wall panel by forming a full penetration weld along the weld line solely from one side of the boiler tube panel in a single pass using a laser beam directed at a laser beam angle measured from a line perpendicular to a plane of the boiler tube wall panel and in a plane perpendicular to the weld line and a GMAW process.

13. A method according to claim 12, further comprising directing a GMAW welding head at a torch angle defined relative to a plane perpendicular to the plane of the panel and containing the weld line and at a lead angle defined relative to a horizontal plane passing through the weld line.

14. A method according to claim 12, further comprising directing the laser beam at a laser beam angle of about 2 to 15 degrees.

15. A method according to claim 12, further comprising directing a GMAW welding head at a torch angle of about 2 to 15 degrees and at a lead angle of about 10 to 50 degrees.

16. A method according to claim 15, further directing the laser beam at a laser beam angle of about 2 to 15 degrees.

17. The method of claim 12, wherein the boiler tube wall panel parts include at least one boiler tube and at least one boiler tube membrane, the at least one membrane having a first edge and a second edge adjacent the at least one boiler tube and further comprising:
   producing a first fillet between the at least one boiler tube membrane and the at least one boiler tube along the weld line;
   producing a second fillet between the at least one boiler tube membrane and the at least one boiler tube opposite the weld line; and
   whereby the first and second fillets are produced by welding only along a single weld line.

18. A method for welding together at least one boiler tube and at least one boiler tube membrane along a weld line, the at least one boiler tube and membrane having two sides, comprising:
   providing at least one boiler tube and at least one boiler tube membrane, the at least one boiler tube membrane having a first longitudinal edge, and a second longitudinal edge along the first longitudinal edge;
   placing the at least one boiler tube and the at least one boiler tube membrane next to each other with the first and second longitudinal edges adjacent the at least one boiler tube; and simultaneously producing a fillet on both sides of the boiler tube and membrane by forming a full penetration weld along the first longitudinal edge solely from one side of the boiler tube and boiler tube membrane in a single pass using a laser beam directed at a laser beam angle measured from a line perpendicular to a plane of the boiler tube wall panel and in a plane perpendicular to the weld line and a GMAW process.

19. The method of claim 18, further comprising:

producing a first fillet and a second fillet by forming a weld only along the first longitudinal edge of the at least one boiler tube membrane;

the first fillet produced between the first longitudinal edge of the least one boiler tube membrane and the at least one boiler tube; and the second fillet produced between the second longitudinal edge of the least one boiler tube membrane and the at least one boiler tube.

20. The method of claim 19, further comprising:

directing a GMAW welding head at a torch angle of about 2 to 15 degrees relative to a plane perpendicular to the plane of the panel and containing the weld line, and at a lead angle of about 10 to 50 degrees defined relative to a horizontal plane passing through the weld line; and directing the laser beam at a laser beam angle of about 2 to 15 degrees.

21. A method for welding together at least two parts of a boiler tube wall panel along a weld line, comprising: placing the at least two parts of the panel adjacent each other, and forming a weld along the weld line using a laser beam and a GMAW process, the GMAW process including the step of directing a GMAW welding head at a torch angle of about 2 to 15 degrees relative to a plane perpendicular to the plane of the panel and containing the weld line, and at a lead angle of about 10 to 50 degrees relative to a horizontal plane passing through the weld line.

22. A method for welding together at least two parts of a boiler tube wall panel along a weld line, comprising: placing the at least two parts of the panel adjacent each other, and forming a weld along the weld line using a laser beam directed at a laser beam angle of about 2 to 15 degrees measured from a line perpendicular to a plane of the boiler tube wall panel and in a plane perpendicular to the weld line, and a GMAW process, the GMAW process including the step of directing a GMAW welding head at a torch angle of about 2 to 15 degrees relative to a plane perpendicular to the plane of the panel and containing the weld line, and at a lead angle of about 10 to 50 degrees relative to a horizontal plane passing through the weld line.

23. A method for welding together at least one boiler tube and at least one boiler tube membrane along a weld line, comprising:

providing at least one boiler tube and at least one boiler tube membrane, the at least one membrane having a first longitudinal edge, a second longitudinal edge and a bevel along the first longitudinal edge, and placing the at least one boiler tube and the at least one boiler tube membrane next to each other with the first and second longitudinal edges adjacent the at least one boiler tube; and producing a first fillet and a second fillet by forming a weld only along the first longitudinal edge of the at least one boiler tube membrane using a laser beam and a GMAW process, the first fillet produced between the first longitudinal edge of the least one boiler tube membrane and the at least one boiler tube, and the second fillet produced between the second longitudinal edge of the least one boiler tube membrane and the at least one boiler tube, by directing a GMAW welding head at a torch angle of about 2 to 15 degrees relative to a plane perpendicular to the plane of the panel and containing the weld line, and at a lead angle of about 10 to 50 degrees relative to a horizontal plane passing through the weld line, and directing a laser beam at a laser beam angle of about 2 to 15 degrees measured from a line perpendicular to a plane of the boiler tube wall panel and in a plane perpendicular to the weld line.

24. A method according to claim 12, wherein the boiler tube wall panel parts include at least two tubes, the method including welding a tangent weld between the tubes.

25. A method according to claim 24, wherein each tube is about 1½ to 3 inches OD with wall thicknesses of about 0.15 to 0.30 inches.

26. A method according to claim 12, wherein the boiler tube wall panel parts include at least one tube and at least one plate, the at least one plate having a first edge and a second edge adjacent the at least one tube, the method including welding a first edge of the at least one plate to an outside surface of the at least one tube.

27. A method according to claim 26, wherein the plate is beveled along the weld line.

28. A method according to claim 26, wherein the tube is about 1½ to 3 inches OD with wall thicknesses of about 0.15 to 0.30 inches, the thickness of the plate being about ¼ to ⅜ inches and the plate being from zero to about 3 inches wide.

29. A method according to claim 12, wherein the boiler tube wall panel parts include at least one tube and at least one round bar, the method including welding the round bar to an outside surface of the tube.

30. A method according to claim 29, wherein the round bar is about ⅛ to ½ inches in diameter.

31. A method according to claim 12, wherein the weld line is about 10 to 60 feet long.

32. A method according to claim 18, wherein the at least one boiler tube is about 1½ to 3 inches OD with wall thicknesses of about 0.15 to 0.30 inches.

33. A method according to claim 18, wherein the at least one boiler tube membrane is beveled at an angle of about thirty degrees along the first longitudinal edge.

\* \* \* \* \*